US005485293A

United States Patent [19]
Robinder

[11] Patent Number: 5,485,293
[45] Date of Patent: Jan. 16, 1996

[54] LIQUID CRYSTAL DISPLAY INCLUDING COLOR TRIADS WITH SPLIT PIXELS

[75] Inventor: Ronald C. Robinder, Albuquerque, N.M.

[73] Assignee: Honeywell Inc., Minneapolis, Minn.

[21] Appl. No.: 130,599

[22] Filed: Sep. 29, 1993

[51] Int. Cl.[6] ............ G02F 1/1335; G02F 1/1343
[52] U.S. Cl. ............ 359/59; 359/68; 345/88; 345/92
[58] Field of Search ............ 359/59, 68; 345/88, 345/92

[56] References Cited

U.S. PATENT DOCUMENTS

| | | | |
|---|---|---|---|
| 4,745,406 | 5/1988 | Hayashi et al. | 359/68 |
| 4,822,142 | 4/1989 | Yasui | 359/59 |
| 4,969,718 | 11/1990 | Noguchi et al. | 359/68 |
| 5,006,840 | 4/1991 | Hamada et al. | 345/88 |
| 5,151,689 | 9/1992 | Kabuto et al. | 359/68 |

*Primary Examiner*—William L. Sikes
*Assistant Examiner*—Ron Trice
*Attorney, Agent, or Firm*—Kenneth J. Johnson; Thomas J. Nikolai

[57] ABSTRACT

An active liquid crystal multi-colored display panel structure comprised of triangular triads of colored display pixels which are rotated 90°. The display comprises a plurality of colored pixel electrodes arranged in rows and columns to form a matrix, wherein a row control line is provided every 1.5 rows of electrodes, and wherein three column control lines are provided for each two columns of electrodes. Thus, a matrix of 720×720 pixel electrodes requires 480 row control lines and 1080 column signal lines. The active liquid crystal display structure can be directly driven by a video source such that 480 active lines of video signal can be mapped directly onto the 720 rows of pixel elements. A switching circuit is provided for controlling the arrangement of R, G and B pixel signals to the column source lines. The triads of pixel elements provided are rotated 90° to maintain high resolution while allowing a standard video signal to be directly mapped onto the display without additional electronics such as a ping-pong memory.

8 Claims, 4 Drawing Sheets

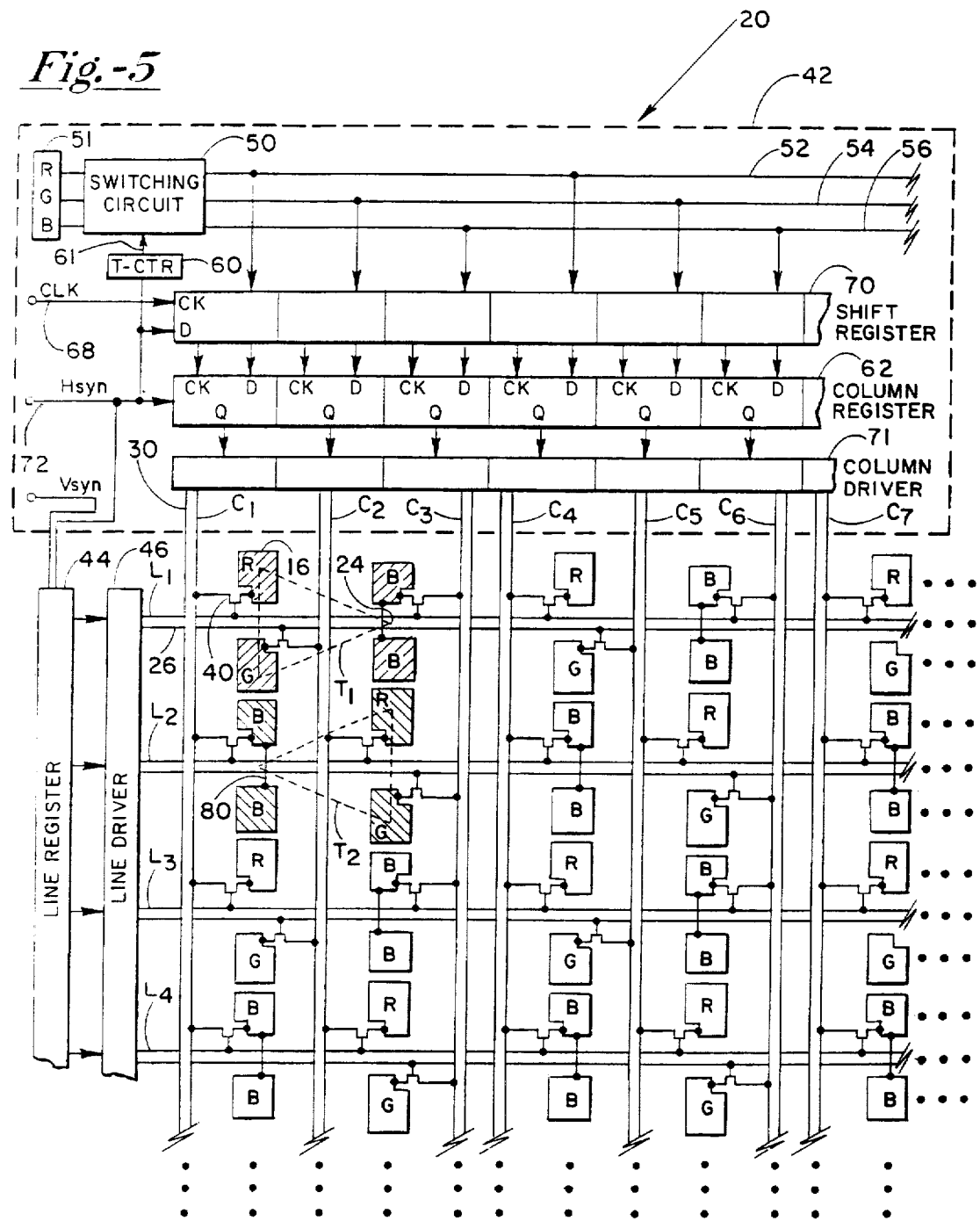

LIQUID CRYSTAL DISPLAY INCLUDING COLOR TRIADS WITH SPLIT PIXELS

BACKGROUND OF THE INVENTION

I. Field of the Invention

The present invention relates to an active-matrix liquid crystal multi-color display panel structure, and more particularly, to a unique display panel structure comprised of generally triangular triads of colored display pixels arranged to permit 480 scan lines of data to be mapped directly onto 720 rows of dots while retaining a normal scanning sense.

II. Discussion of the Prior Art

Active-matrix liquid crystal multi-colored display panel structures are typically comprised of a matrix of colored display pixels arranged in rows and columns and which are controlled by semiconductor switching devices. The semiconductor switching devices are typically comprised of thin-film transistors of, for example, the amorphous-silicon field-effect design. Typically, multi-colored images are produced on liquid crystal display panels by providing colored filters in association with pixel electrodes across a layer of liquid crystal. Construction techniques of liquid crystal multi-colored display panel structures are well known in the art, and many control schemes can be implemented to control each of the colored filters.

The pixel arrangement and control scheme can determine the image quality, resolution, and the unwanted generated picture artifacts associated with the particular pixel arrangement and control scheme. Construction of active-matrix liquid crystal multi-colored display panel structures and some of the associated artifacts are discussed in detail in U.S. Pat. No. 4,969,718 to Noguchi, et al., which is assigned to NEC Corporation, and in U.S. Pat. No. 4,822,142 to Yasui and which is assigned to Hosiden Electronics Company, Ltd. Both patents are incorporated herein by reference.

Present research and development efforts are continuously improving the picture quality of color images generated on display panels. Arranging colored pixel elements in triangular arrangements, commonly referred to as triads, is one known design method of improving picture quality and resolution. Arranging the colored pixel elements in triads is generally preferred over other arrangements such as linear groups or "L" shaped groups.

The present invention is directed to facilitate the mapping of video data from a video source onto a panel which has an insufficient number of dots to permit a simple 1:1 mapping of the incoming data onto the display surface. In particular, the problem addressed is how to map a 480 active line color video onto a surface with 720 rows of 720 columns of pixel elements or dots. The video data is typically transmitted from a signal source, such as a digital map comprising 480 slit samples, each of which is in an analog data stream format.

A display panel having a matrix display which can accommodate directly mapping 480 active lines of color video signals onto a display surface with 720 rows and 720 columns of pixel elements display while retaining the normal scanning sense is desirable to reduce cost and design complexity. A restructured panel comprising pixel electrodes and interconnects to the dots which permits the panel to be scanned directly, with no need for auxiliary memory or components is preferred.

OBJECTS OF THE INVENTION

It is accordingly a principal object of the invention to provide a liquid crystal multi-colored display panel structure which permits 480 scan lines to be mapped directly onto 720 rows of pixel dots while retaining the normal scanning sense.

It is a further object of the present invention to provide a liquid crystal multi-colored display panel structure which is composed of a plurality of triangular triads of multi-colored display pixel electrodes to ensure a high quality picture with a high resolution.

It is still yet a further object of the present invention to provide a liquid crystal multi-colored display panel structure which incorporates a practical amount of scanning control lines and column signal lines, and wherein the colored pixel elements are of an acceptable size to provide high resolution yet which can be easily manufactured.

It is still yet another object of the present invention to provide a liquid crystal multi-colored display panel structure wherein the plurality of triads of pixel elements are arranged and controlled such that unpleasant display artifacts are reduced.

SUMMARY OF THE INVENTION

The foregoing features and objects are achieved by providing a liquid crystal multi-colored display panel structure having triads of colored display pixel electrodes which are rotated 90°, wherein a scanning control line is provided every 1.5 rows of electrodes and wherein three column signal lines are provided for every two columns of colored display pixel electrodes. This design results in one of the three colors of display pixel electrodes being bisected throughout the display. This arrangement allows 480 scan lines to be mapped directly onto 720 rows of pixel electrodes while retaining the normal scanning sense. No auxiliary memory or line storing is required, and the display panel structure can be manufactured using practical techniques.

The liquid crystal multi-colored display panel structure comprises a substantially transparent substrate having a plurality of colored display pixel electrodes disposed thereon to form a matrix having columns in the first direction and rows in a second direction. The colored display pixel electrodes include three types of colors, namely the primary colors of red, blue and green. The colored display pixel electrodes in adjacent columns are offset approximately one-half distance from one another such that they form a plurality of generally triangular triads which are rotated 90° from conventional and prior art arrangements. Thus, one side of each triad extends in the vertical direction. A plurality of column signal lines are disposed between the pixel columns of the matrix and extend in a first or vertical direction. A single signal line is provided between alternate adjacent columns of pixel electrodes, and a pair of signal lines are alternately disposed between the other adjacent columns, resulting in three column signal lines for every two columns of pixel electrodes. Thus, the resulting arrangement is an alternating pattern of one and two column signal lines extending between the columns of pixel electrodes.

The second portion of the control structure includes a plurality of scanning control lines disposed every one and one-half rows of the matrix display and which extend in a second or horizontal direction. These scanning control lines extend between two pixel electrodes of two different colors of a triad in alternating columns, such that the scanning line extends across or bifurcates the third pixel electrode of the triad of a third color in alternating columns. Thus, each triad of pixel electrodes comprises one pixel electrode of a first and second color on opposite sides of the horizontal scanning line, while one bifurcated pixel electrode of the third color is defined to the left or right of the first two electrodes, such that the triads are interlaced.

A plurality of switching transistors are provided, one coupled to each of the first and second color types of pixel electrodes, and one connected to at least one of the two halves of the third color type of pixel electrodes. The two halves of the third type of electrodes can either be electrically connected together such that they are both controlled by one transistor, or a separate transistor can be provided for each of the halves. Each transistor is preferably comprised of a thin-film FET having a first terminal or drain connected to one of the colored display electrodes, a second terminal or gate connected to one of the signal lines, and the third terminal or source connected to one of the column scanning lines to control conductivity between the respective first and second terminals. The third terminal of the switching transistors associated with the colored display electrodes of the first and second colors of each triad are defined on opposite sides of the scanning control line. As such, the gate or gates associated of the colored display electrodes of the third color type of each triad are disposed on one or the other of opposite sides of the respective scanning line. If both halves of the electrodes of the third type are electrically tied together, only one switching transistor is required for both halves of the pixel electrodes. Otherwise, a separate transistor can control the respective half of the pixel electrode of the third color type. It is noted that only one scanning control line is provided for each triad of pixel electrodes. Thus, only one gate pulse is required per triad and the control interface need not be complicated.

In one embodiment of the invention, two of every three of the column signal lines are connected to the second terminals of the switching transistors associated with the pixels of two different color types. This provides, for instance, one column signal line to be connected to only those pixel electrodes of one color type, such as green in adjacent columns. The other two signal lines will each be connected to the other two types of pixel electrodes in adjacent columns, such as the blue and red pixel electrodes. The column signal lines will control the pixel electrodes of a triad addressed by the scanning control line. In operation, as the rows of pixel electrodes of the display are scanned from top to bottom, when scanning the odd rows, a column signal line will control one color, such as red. When scanning the even rows, the same signal line will control the blue color pixel electrodes. Again, the third of every three column signal lines control electrodes of only one color, such as green, regardless of whether an even or odd row of pixels is being scanned.

In another embodiment of the present invention, each of the column signal lines is connected to the second terminal of the switching transistors associated with the electrodes of two different color types. Thus, when scanning odd rows, each column signal line will control pixel electrodes of one color of each triad, and when scanning even rows, the same column signal line will control pixel electrodes of each triad of the other color. The scanning control line which is scanned determines which electrode is controlled. The column signal lines provide a variable voltage to each of the scanned pixel electrodes to generate a field in the liquid crystal between the respective pixel electrodes and the common electrode to control the passage of light therethrough. Light having the appropriate wavelength selected for the color filter associated with the particular color display is, thus, passed through the color filter so that a picture element in any of a total of eight different colors can be produced by a triad of pixels respectively assigned to the three primary colors. Thus, a full color picture can be produced which is composed of picture elements with steplessly varied color tones.

The display panel structure includes control circuitry for connecting and coordinating the column signals between a control signal bus and the signal lines, which is dependent on whether an odd or even row of pixels is being scanned. A row drive circuit is connected to the scanning control lines for driving each of the plurality of scan lines in synchronism with the horizontal scanning cycle of a video signal, and a column drive circuit is connected to the column signal lines for supplying a video signal to each of the signal lines wherein the input of the column drive circuit is connected to a control circuit which provides the video signals.

BRIEF DESCRIPTION OF TEE DRAWINGS

FIG. 5 is an yet another alternative embodiment of the present invention wherein the bifurcated pixel electrode of each triad of the third color is controlled by a single switching transistor and each half being electrically connected to the other.

Figure 1:
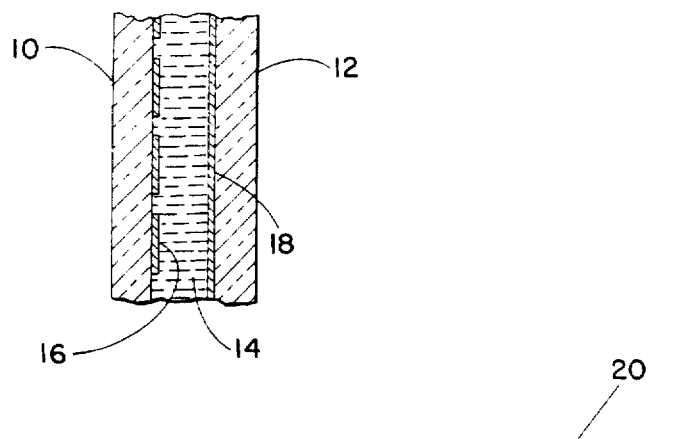
FIG. 1 is a sectional view showing, in a simplified form, the general construction of a prior art liquid crystal display device.

Other objects, features and advantages of the present invention will become apparent to those skilled in the art upon reading the following Description of the Preferred Embodiment, the "Claims", and by referring to the drawings herein in which like numerals refer to like elements.

DESCRIPTION OF THE PREFERRED EMBODIMENT

Referring to FIG. 1, there is shown a liquid crystal display device which comprises a pair of transparent substrates 10 and 12 and a liquid crystal 14 sealed therebetween. A plurality of transparent square display electrodes are provided on the inner surface of one of the transparent substrates 10 and 12. A transparent common electrode 18 is provided on the entire inner surface of the other substrate 12 opposite electrodes 16. The display electrodes 16 are arranged in rows and columns and are actively controlled by thin film transistors attached to them. The thin film transistors are controlled by row or scanning drive lines and column signal drive lines. A more detailed description of a typical prior art colored liquid crystal display device is described in U.S. Pat. No. 4,822,142 which is hereby incorporated by reference.

Figure 2:
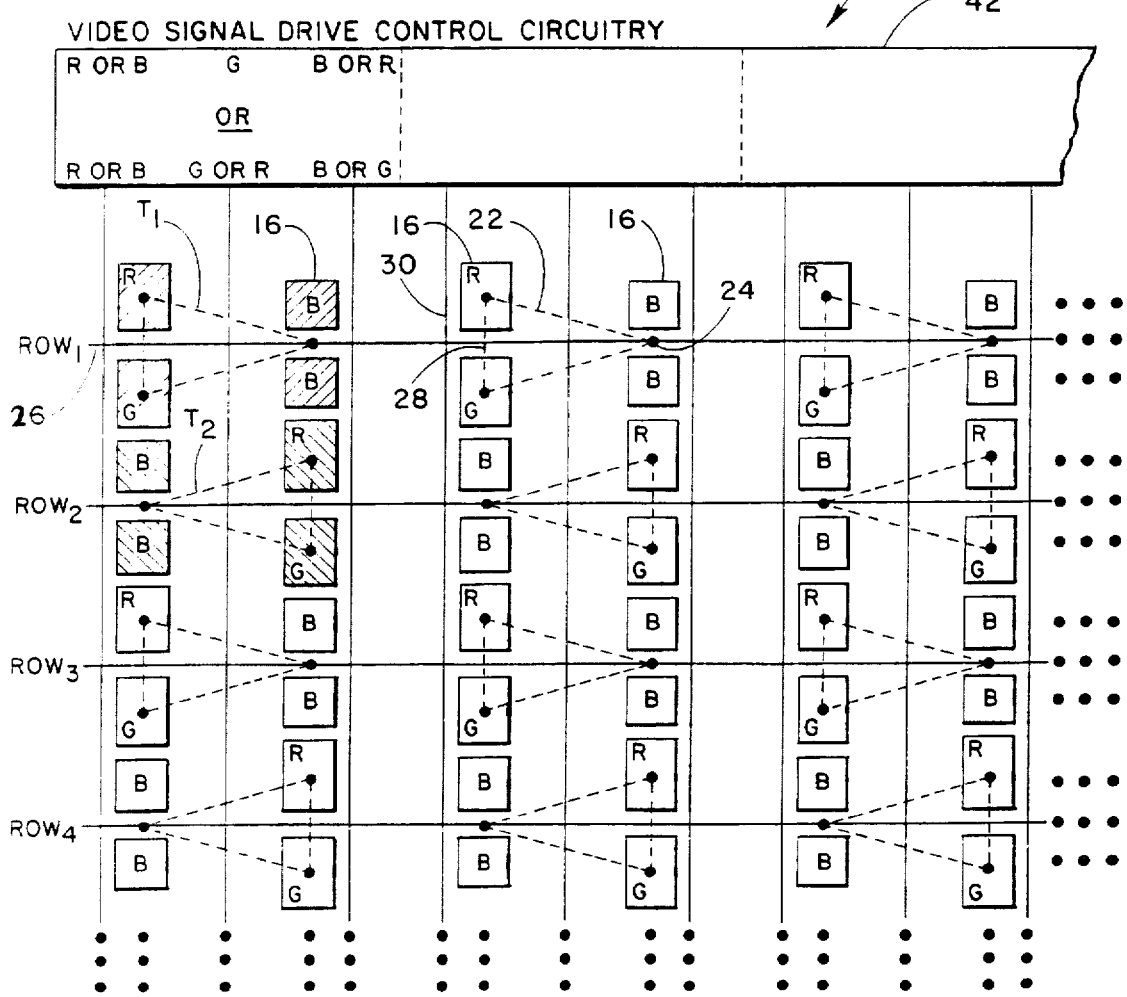
FIG. 2 is a view showing a relation among display electrodes which are arranged in triads of three-colored display-element sets, wherein the triads are rotated 90° and wherein the scanning control lines for each row of triads extends between two electrodes of different colors and bifurcates one electrode of a third color.

Referring to FIG. 2, the preferred embodiment of an active-matrix liquid crystal multi-colored display panel structure is generally shown at 20. Display 20 is manufactured using well-known techniques, such as techniques used to create the structure shown in FIG. 1. However, the preferred embodiment of the present invention is vastly different from prior art displays in that the arrangement and interconnection of the display electrodes, the row scanning and column signal drive lines, and the arrangement of the thin film transistors is unique compared to prior art arrangements. In FIG. 2, display electrodes 16 are arranged in rows and columns to form a display matrix as shown. The pixel electrodes 16 are comprised of one of three colors, namely, the primary colors of red, blue or green. The pixel electrodes 16 are arranged in a pattern producing a plurality of generally triangular interleaved triads of colored display pixels. Each triad comprises one pixel of each of the three primary colors. These color groups or triads are represented by the dotted triangular grouping identified at 22. Each of the triads 22 form a triangle shape and have an apex shown at 24. Apex 24 is always centered over a respective row or scanning control line 26. All triads 22 are oriented and interleaved such that the apex 24 of the triads 22 are disposed on either the right side or the left side of the triangle as one observes the display with the column drive lines extending in the vertical direction as shown in FIG. 2. Hence, electrodes 16 in adjacent columns are offset from one another one-half pitch distance, which is half the height of an electrode 16.

The arrangement of pixel electrodes into triads is well known for providing a picture of enhanced resolution which is free from image moires. However, the arrangement of the triads 22 in accordance with the present invention is unique from the prior art because each triad 22 is rotated 90° such that one side 28 of each triad 22 extends in the vertical direction. As shown, one complete pixel electrode 16 of triad 22 lies on the other side of the respective scanning control line 26, while the third pixel electrode 16 of the triad proximate apex 24 is divided or bifurcated by control line 26 with one-half of the bifurcated pixel electrode 16 situated on each side of control line 26. Thus, only one of the three pixel electrodes 16 which form each triad 22 is divided or intersected by a control scanning line 26. None of the pixel electrodes 16 is intersected by any of the column signal control lines 30. As shown in FIG. 2, several column signal control lines 30 are provided. Specifically, there are three control lines 30 for each triad 22. In other words, there are three control lines for each two columns of pixel electrodes 16, yielding 50% more signal control lines 30 than columns of pixel electrodes 16. While this arrangement necessitates a higher interconnect density in the horizontal direction and also requires additional gray scale driver electronics, current and improving technologies for integrated driver electronics, such as chip-on glass or direct transistor deposition techniques can provide the necessary higher interconnect densities at a reasonable cost.

Still referring to FIG. 2, a first triad group $T_1$, and a second triad group $T_2$ are shown and are shaded for illustration purposes. Triad groups $T_1$ and $T2$ are also consistently shown in FIG. 3 as will be discussed shortly. Triads 22, typified by triad $T_1$, are all arranged with apex 24 to the right in odd rows of triads and in even rows, such as triad $T_2$, the apex 24 is positioned to the left. This arrangement allows the triads in adjacent rows to interleave and provide a high density of pixel electrodes 16 per unit area. High density, of course, translates into high resolution pictures without undesirable display artifacts.

One key feature of the present invention is that only one scanning control line 26 is required per triad 22. Hence, only one gate pulse needs to be provided, allowing for less complex driving electronics. A control line 26 is provided only every 1.5 rows of pixel electrodes 16. This design is advantageous over prior art displays because the pixel electrodes 16 can be larger in area than pixel electrodes in displays having a scanning line for every row of pixel electrodes and manufacture is simplified. Moreover, prior art displays having a scanning control line for every other row of pixel electrodes are inferior because the smaller electrodes of the present invention provide higher image quality and resolution. Thus, the present invention is unique from the prior art due to the unique design arrangement of the scanning control lines and the column signal control lines and the rotated triads to achieve a display panel capable of high quality images yet which can be directly driven by the control electronics.

Figure 3:
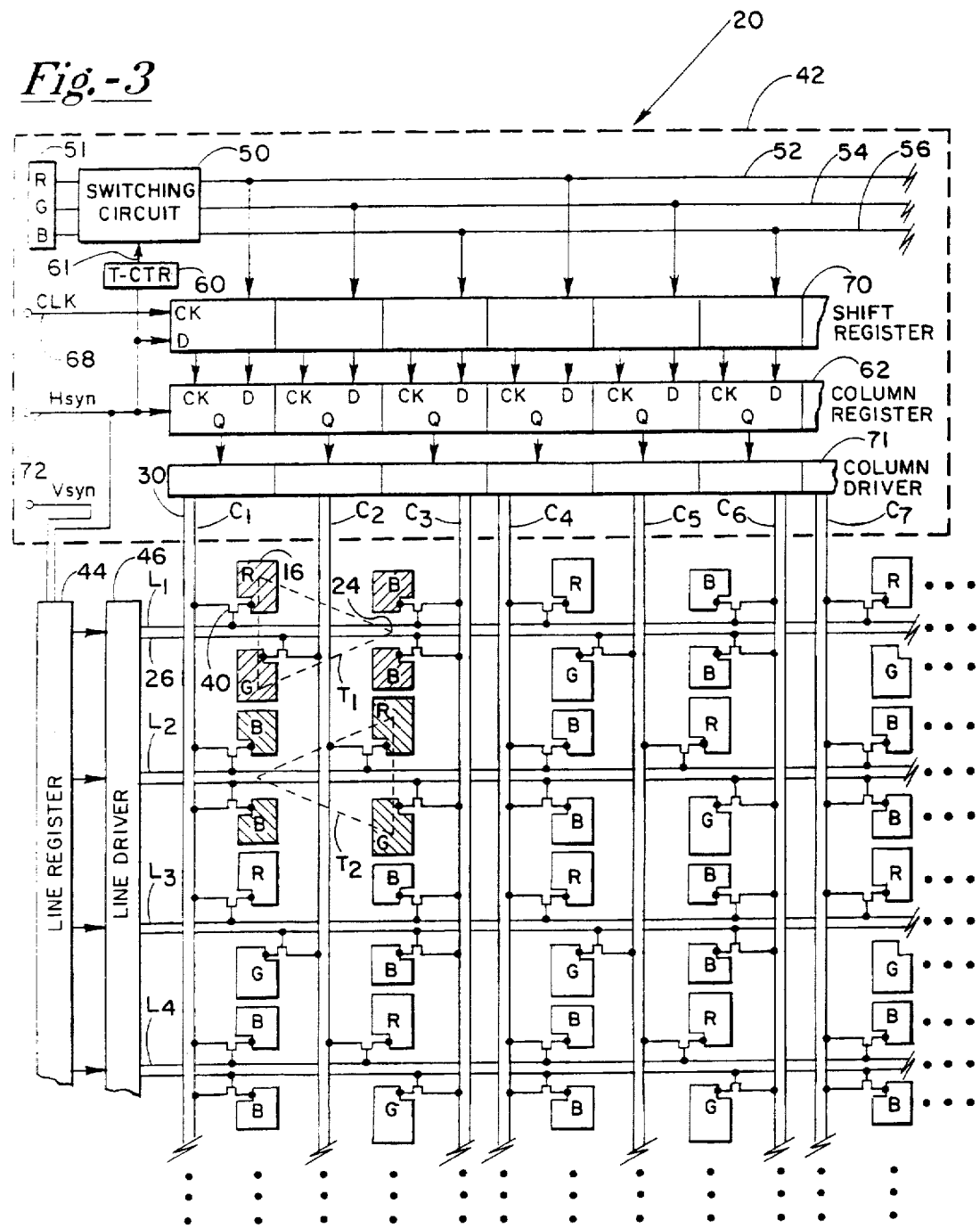
FIG. 3 is a view showing the relation among display electrodes, drive lines including column and scanning lines, and the thin film transistors which control the corresponding electrodes, wherein a separate thin film transistor is provided for each half of the bifurcated electrode, and wherein each of the three signal lines can control electrodes of two different color types.

Referring to FIG. 3, the relation of the display electrodes 26 to the column signal drive lines 30, row or scanning drive lines 26, thin film transistors 40 and drive/control circuitry 42 is illustrated. For purposes of illustration and clarification, consecutive row or scanning control lines 26 have been labeled $L_1$, $L_2$, $L_3$ . . . from top to bottom, and wherein column signal control lines 30 are referenced left to right as $C_1$, $C_2$, $C_3$ . . . Triads $T_1$ and $T_2$ correspond to the triads discussed in relation to FIG. 2. Each of pixel electrodes 16 are controlled by a respective thin film switching transistor 40, as will be discussed in greater detail shortly. Circuit 42 provides controls and drives the column control signals, consisting of pixel information, to the three-color display element sets forming the pixel array, as will now be described in detail.

Alternate rows of scanning drive lines 26 are driven in synchronism with the horizontal sync pulses $H_{syn}$ by the conventional arrangement of a row register 44 and a row drive circuit 46. More specifically, all the odd rows labeled $L_1$, $L_3$ . . . are first successively driven in synchronism with the horizontal sync pulses, and then the even row drive lines, $L_2$, $L_4$ . . . are driven to complete a picture on the display in an interlaced manner. A switching circuit 50, forming a subset of circuit 42 connects the input signal lines R, G and B to control signal busses 52, 54 and 56 as shown. When the odd rows of triads are being scanned by the driving electronics via lines $L_1$, $L_3$ . . . , switching circuit 50 routes the signals R, G and B, labeled as inputs 51, to color signal busses 52, 54, and 56, respectively. Thus, signal control line $C_1$ provides red pixel information to each of the adjacent red pixel electrodes 16, signal control line $C_2$ provides green pixel information to each of the adjacent green pixel electrodes, and signal control line $C_3$ provides blue pixel information to each of the adjacent blue pixel electrodes 16. Subsequently, when even rows of triads are stroke scanned, via scanning lines, $L_2$, $L_4$ . . . , switching circuit 50 provides the R, G and B pixel information to color signal busses 56, 52 and 54, respectively. Thus, in the preferred embodiment, each signal control line $C_1$, $C_2$, $C_3$ . . . can provide pixel information of two different colors to adjacent columns of electrodes 16 as controlled by bus switching circuit 50.

A tertiary counter 60 is provided between terminal 72 providing the $H_{syn}$ horizontal sync pulse and switching circuit 50. Counter 60 counts to $_{240}$ (half the number of total scan lines) as the row control electronics completes scanning the 240 odd rows of control lines 26. Counter 60 provides switching circuit 50 a control signal on line 61 to initiate the rearrangement of the R, G and B pixel signals to color signal busses 52, 54 and 56 before the subsequent scanning of the even rows of control signals 26. Thus, to generate one complete frame on the display 20, the odd row control lines 26 labeled $L_1$, $L_3$ . . . are scanned first, and then the even control lines 26, labeled $L_2$, $L_4$ . . . are scanned. Switching circuit 50 rearranges the R, G and B inputs labeled 51 to color signal busses 52, 54 and 56 only twice every generated frame on the pixel array 20.

To generate an image on display 20, pixel information is first loaded from the respective colored signal bus 52, 54 and 56 into column registers 62. A clock signal, CLK, having three times the dot frequency of the input colored video signal is supplied as a shift clock from a clock terminal 68 to a shift register 70. The horizontal sync pulse $H_{syn}$ is supplied as data from the terminal 72 to the first stage of the shift register 70 at the start of each horizontal scanning cycle period. Colored pixel data from the individual stages of the column register 62 are fetched successively in response to the respective output of the shift stages of the shift register 70. Thus, as the odd or even row drive lines 26 are successively driven in synchronism with the horizontal sync pulses $H_{syn}$ by the conventional arrangement of row registers 44 and row drive circuit 46, pixel data will be provided by the respective column register 62 via a column driver 71 to the respective column control line 30.

Multiple parallel column register 62 can be provided, such that while a gate pulse is active for one of the row control lines 26, (such as control line $L_1$), the pixel data for the electrodes of the next scan line (such as line $L_3$), is being sampled and placed into sample and hold registers of the column registers 62. Thus, when the pixel data is provided on source lines $C_1$, $C_2$, $C_3$ . . . , as one row of triads of pixels is being scanned, data for the next row of triads to be scanned is being routed to color signal busses 52, 54 and 56 which is to be subsequently loaded into column registers 62. This arrangement allows the display electrodes 16 to be directly driven without auxiliary memory or line storage capabilities.

Figure 4:
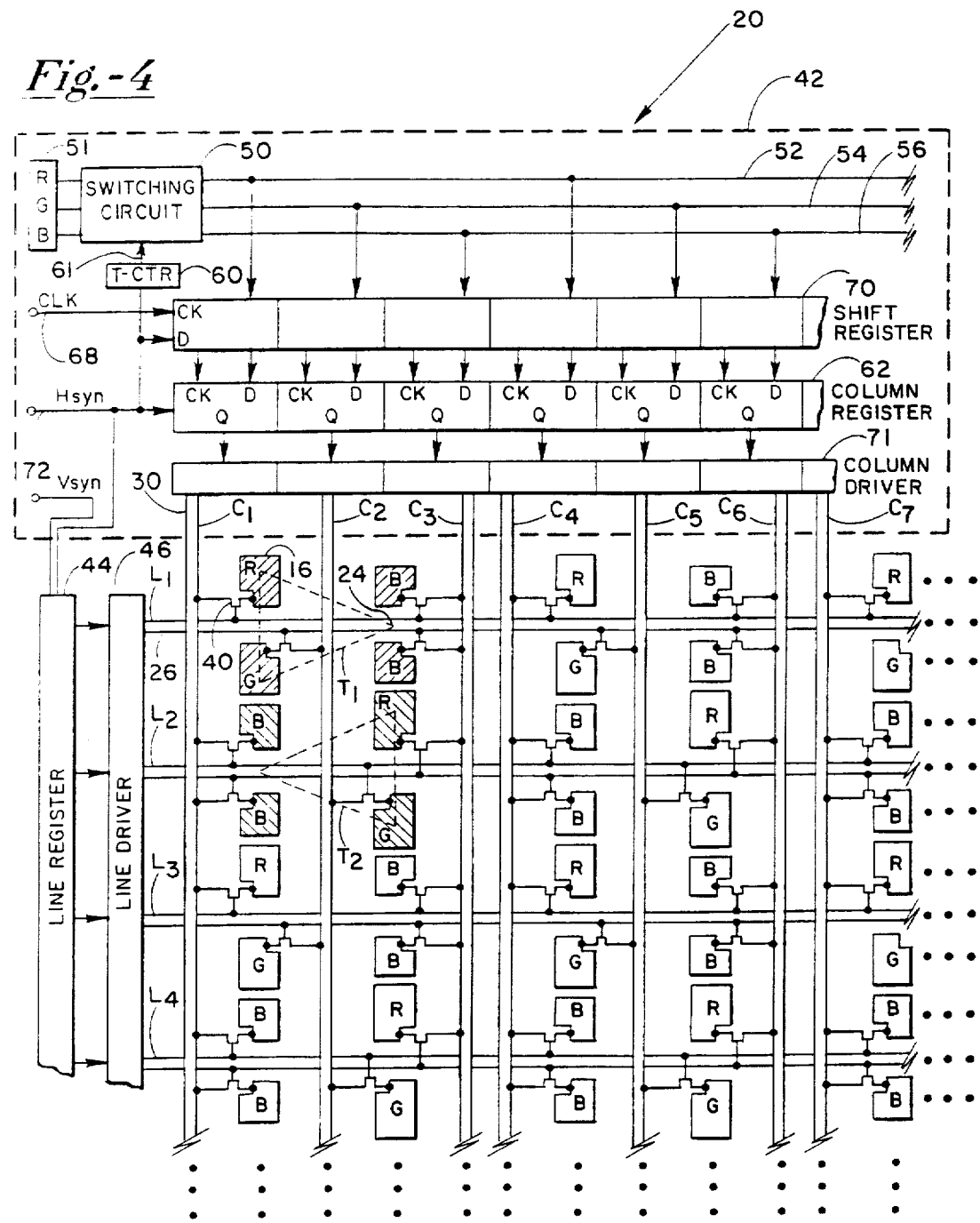
FIG. 4 is an alternative embodiment of the preferred invention modified such that one of every three column signal lines controls an electrode of only one color type, with the other two column signal lines controlling pixel electrodes of two different color types.

Still referring to FIG. 3, a thin film switching transistor 40, comprised of a FET, is provided for each red and green pixel electrode 16. FET 40 is also provided for each of the two blue pixel electrodes 16 of each triad 22. It is noted that the arrangement of electrodes could be interchanged such that it is the green electrodes or the red electrodes 16 which are divided in half. Hence, limitation to the exact orientation of colored electrodes by color is not to be inferred. As each control line 26 is scanned, the respective switching transistors 40, having a gate terminal connected thereto, are rendered conductive. The source terminal of each switching transistor 40 is connected to an adjacent control line 30, and the drain terminal of each switching transistor 40 is connected to the adjacent respective pixel electrode 16. Thus, as the respective switching transistor 40 is rendered conductive by the adjacent control line 26, the pixel information, or voltage on the respective adjacent column signal line 30, is provided through the conductive FET to the respective pixel electrode 16. Thus, pixel information provided on the signal control lines 30 are presented only to the pixel electrodes 16 adjacent the scanned row control line 26. The pixel information for the bifurcated blue pixel electrodes 16 is provided to each of the pixel electrodes, via the respective adjacent switching transistor 40. Referring to FIG. 4, an alternative embodiment of the present invention is shown. Here, column signal line $C_2$, is only coupled, via a respective switching transistor 40, to each of the green pixel electrodes 16 in each adjacent column of pixel electrodes. The other two column signal control lines $C_1$ and $C_3$ are coupled to two different colors of pixel electrodes in adjacent columns of pixel electrodes 16. As shown, both signal control line $C_1$ and $C_3$ are coupled via switching transistors 40 to each of the blue and red pixel electrodes 16 in adjacent columns. When signal control line $C_1$ is providing pixel information to the red pixel electrodes 16 of the adjacent columns, signal control line $C_3$ is providing pixel information to the blue pixel electrodes 16. Thus, as the odd row control lines 26 are scanned, pixel information for the red pixel electrodes is provided on control line $C_1$, green pixel information is provided on signal control line $C_2$, and blue pixel information is provided on signal control line $C_3$. When the even row control lines 26 are scanned, switching circuit 50 reverses the connections of the R and B source lines 51 to the corresponding color signal busses 52 and 56 such that signal column line $C_1$ provides blue pixel information to the blue pixels 16 and signal column line $C_3$ provides pixel information to the red pixel electrodes 16 in the adjacent columns. This arrangement somewhat simplifies the switching circuit 50 and control arrangement shown in FIG. 3. One column control, such as $C_2$, line is always dedicated to one color of pixel electrodes 16, wherein the other two column signal control lines alternately control the red and blue pixel electrodes 16. Again, whether an odd or even row control line 26 is being scanned dictates whether switching circuit 50 is routing the red pixel signals on R to color signal bus 52 or 56, and whether the blue pixel signals on B are being routed to color signal bus 56 or 52.

Another alternative embodiment of the present invention is shown in FIG. 5. Here, each of the two blue pixel electrodes 16 for a particular triad 22 are electrically connected together via a conductive bridge (80). Only one switching transistor 40 is required to provide pixel information from the respective signal control line 30 to each of the blue pixel electrodes. Thus, only one switching transistor 40 is required for each of the three colors of pixel electrodes in a triad 22. In other words, only three switching transistors 40 are required for each triad 22.

Referring now back to FIG. 3, one of the principal features of the present invention is that 480 row control lines 26 are used for 720 pixel electrodes 16 in each column, with the bifurcated blue electrode being considered one electrode. Thus, a standard 480 active line colored video signal can be directly mapped onto a display panel structure having 720 columns of electrodes 16. Further, the 720 pixel electrodes 16 in each row, wherein each triad 22 comprises electrodes of two adjacent columns, are partitioned such that there are a total of 360 triads of pixels 16 in each row which also corresponds to the number of pixel samples per line of the video source. Thus, the video source having 480 active colored signal control lines with 360 signal source samples can be directly mapped onto the display of the present invention. No auxiliary memory or line storage components are required. The rotation of the triads 22 by 90° provides for a unique display without requiring a "ping-pong" memory. High resolution is maintained, the control electronics remain simple and manageable, and the current manufacturing techniques can be implemented.

It is noted that the present matrix architecture could be employed in other matrix technologies as well including, but not limited to, EL displays, plasma displays, and field emission displays. Hence, limitation to an LCD display is not to be inferred.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. A liquid crystal multi-color display panel structure, comprising:

(a) a substantially transparent substrate;

(b) a plurality of color display pixel electrodes disposed on said substrate in a matrix array having columns extending in a first direction and rows extending in a second direction transverse to said first direction, said color display pixel electrodes consisting of those of a first type for displaying in a first preselected color, those of a second type for displaying in second preselected color different from said first preselected color, and those of a third type for displaying in a third preselected color different from said first and second preselected colors, the color display pixel electrodes of each of said columns being approximately a half pitch distance offset from the color display pixel electrodes of the adjacent column, wherein one of said pixel electrode of each said first, second and third preselected colors together form a generally triangular triad having one side extending in a vertical direction;

(c) a plurality of signal lines disposed between the columns of said electrodes forming the matrix array and extending in the first direction, wherein a single one of said plurality of signal lines is alternately disposed between adjacent ones of said columns, and wherein two of said plurality of signal lines are alternately disposed between adjacent ones of said columns such that there are three total of said plurality of signal lines for every two of said columns;

(d) a plurality of scanning lines, one scanning line being disposed every one and one-half rows of said electrodes forming said matrix array and extending in the second direction between two said electrodes of said first and second types in alternating ones of said columns and bifurcates one said electrode of said third type into a first and second half in alternating ones of said columns;

(e) a plurality of switching transistors, each said transistor having a first terminal connected to one of said color display pixel electrodes, a second terminal connected to one of said signal lines, and a third terminal connected to one of said scanning lines to control conductivity between the respective first and second terminals;

(f) row drive means connected to said scanning lines for driving each said plurality of scanning lines in synchronism with the horizontal scanning cycle of a video signal;

(g) column drive means having an input, and an output connected to said signal lines for supplying a video signal to each of said signal lines where two of every three of said signal lines are connected to the third terminals of the switching transistors associated with the pixel electrodes of two of said color types; and (h) control means coupled to the input of said column drive means for controlling which of said video signals are supplied to said signal lines.

2. The display panel structure of claim 1 wherein said control means alternatively supplies the video signal of two of said color types to two of every three of said signal lines.

3. The display panel structure of claim 1 wherein the first and second halves of said third type of electrodes are electrically connected together.

4. The display panel structure of claim 1 wherein one of said switching transistors is connected to each of said first and second halves of said third type of electrodes with each transistor disposed on opposite sides of the adjacent scanning line from the other.

5. A liquid crystal multi-color display panel structure, comprising:

(a) a substantially transparent substrate;

(b) a plurality of color display pixel electrodes disposed on said substrate in a matrix array having columns extending in a first direction and rows extending in a second direction transverse to said first direction, said color display pixel electrodes consisting of those of a first type for displaying in a first preselected color, those of a second type for displaying in second preselected color different from said first preselected color, and those of a third type for displaying in a third preselected color different from said first and second preselected colors, the color display pixel electrodes of each of said columns being approximately a half pitch distance offset from the color display pixel electrodes of the adjacent column, wherein one of said pixel electrode of each said first, second and third preselected colors together form a generally triangular triad having one side extending in a vertical direction;

(c) a plurality of signal lines disposed between the columns of said electrodes forming the matrix array and extending in the first direction, wherein a single one of said plurality of signal lines is alternately disposed between adjacent ones of said columns, and wherein two of said plurality of signal lines are alternately disposed between adjacent ones of said columns such that there are three total of said plurality of signal lines for every two of said columns;

(d) a plurality of scanning lines, one scanning line being disposed every one and one-half rows of said electrodes forming said matrix array and extending in the second direction between two said electrodes of said first and second types in alternating ones of said columns and bifurcates one said electrode of said third type into a first and second half in alternating ones of said columns;

(e) a plurality of switching transistors, each said transistor having a first terminal connected to one of said color display pixel electrodes, a second terminal connected to one of said signal lines, and a third terminal connected to one of said scanning lines to control conductivity between the respective first and second terminals;

(f) row drive means connected to said scanning lines for driving each said plurality of scanning lines in synchronism with the horizontal scanning cycle of a video signal;

(g) column drive means having an input, and an output connected to said signal lines for supplying a video signal to each of said signal lines where each said signal line is connected to the third terminal of the switching transistors associated with the electrodes of two of said color types; and (h) control means coupled to the input of said column drive means for controlling which of said video signals are supplied to said signal lines.

6. The display panel structure of claim 5 wherein said control means alternatively supplies the video signal of two of said types of colors to each of said signal lines.

7. The display panel structure of claim 5 wherein the first and second halves of said third type of electrodes are electrically connected together.

8. The display panel structure of claim 5 wherein one of said switching transistors is connected to each of said first and second halves of said third type of electrodes with each transistor disposed on opposite sides of the adjacent scanning line from the other.

* * * * *